(12) United States Patent
Wu

(10) Patent No.: US 7,537,229 B1
(45) Date of Patent: May 26, 2009

(54) UNICYCLE WITH AUXILIARY WHEELS

(76) Inventor: Pao-Kung Wu, No. 80-1, Nandi Lane, Sioushuei, Changhua (TW)

( * ) Notice: Subject to any disclaimer, the term of this patent is extended or adjusted under 35 U.S.C. 154(b) by 0 days.

(21) Appl. No.: 12/052,740

(22) Filed: Mar. 21, 2008

(51) Int. Cl.
*B62K 1/00* (2006.01)
(52) U.S. Cl. ........................................ 280/205; 280/293
(58) Field of Classification Search ................. 280/205, 280/293
See application file for complete search history.

(56) References Cited

U.S. PATENT DOCUMENTS

| 323,289 | A | * | 7/1885 | Blount | 280/293 |
| 359,127 | A | * | 3/1887 | Brusie | 280/293 |
| 524,019 | A | * | 8/1894 | Desmond | 280/205 |
| 1,077,210 | A | * | 10/1913 | Alesani | 280/293 |
| 2,450,979 | A | * | 10/1948 | Moller | 280/293 |
| 3,437,351 | A | * | 4/1969 | St Clair Newbern | 280/205 |
| 4,657,272 | A | * | 4/1987 | Davenport | 280/266 |
| 4,746,132 | A | * | 5/1988 | Eagan | 280/1.13 |
| 5,064,213 | A | * | 11/1991 | Storch | 280/301 |
| 2006/0131830 | A1 | * | 6/2006 | Berg | 280/205 |

* cited by examiner

*Primary Examiner*—Tony H. Winner

(57) ABSTRACT

A unicycle includes an n-shaped fork and a wheel rotatably mounted between two lower ends of the fork via a drive axle. The drive axle has two opposite ends each having a crank mounted thereon. A pedal mounted on a free end of each crank. A seat post is longitudinally and securely mounted on an upper end of the fork. A seat is attached to a free end of the seat post. A curved sleeve is connected to the seat post and concentrically corresponds with the wheel. A connecting post is telescopically received in the curved sleeve. The connecting post has a free end with two opposite sides each having an L-shaped linkage mounted thereon. Two auxiliary wheels each is rotatably mounted on a free end of each linkage.

2 Claims, 5 Drawing Sheets

UNICYCLE WITH AUXILIARY WHEELS

BACKGROUND OF THE INVENTION

1. Field of the Invention

The present invention relates to a unicycle, and more particularly to a unicycle with two auxiliary wheels for user to easily learn how to ride the unicycle.

2. Description of Related Art

Conventionally, the unicycle only appears in a variety show or a circus. However, a unicycle can train rider's balance level and the coordination of user's body such that the unicycle is gradually accepted as sports equipment.

As usual, the unicycle includes a fork and a wheel rotatably mounted to a lower end of the fork. A drive axle centrally extends through the wheel and has two opposite ends each having a crank mounted thereon after the drive axle extending through the wheel. A pedal is mounted to a free end of each of the two cranks for user to step thereon and drive the wheel. A seat post is longitudinally mounted to an upper end of the fork and a seat is disposed to a free end of the seat post for user to sit thereon during riding the unicycle.

The unicycle has only one wheel such that the ride skill of the unicycle is more difficult than that of a bicycle. As a result, some people give up learning to ride the unicycle because they often fall from the seat of the unicycle and gradually lose his/her confidence of riding unicycle during learning. It's a pity.

The present invention has arisen to mitigate and/or obviate the disadvantages of the conventional unicycle.

SUMMARY OF THE INVENTION

The main objective of the present invention is to provide an improved unicycle that has two auxiliary wheels mounted thereon for a user to easily learn how to ride the unicycle.

To achieve the objective, the unicycle in accordance with the present invention comprises an n-shaped fork with two lower open ends and an upper closed end, a wheel rotatably mounted between the open ends of the fork via a drive axle centrally extending through the wheel and the open ends of the fork, the drive axle having two opposite ends each having a crank mounted thereon, a pedal mounted to a free end of each of the cranks for a user to step thereon and drive the wheel via the drive axle, a seat post longitudinally securely mounted on the closed end of the fork, a seat attached to a free end of the seat post for the user to sit thereon when riding the unicycle, a curved sleeve connected to the seat post from the rear of the unicycle, the curved sleeve being concentric relative to the wheel, a quick-release device disposed on a free end of the curved sleeve, a connecting post telescopically received in the curved sleeve, the connecting post being curved and concentrically corresponding to the wheel such that the connecting post is adapted to move relative to the curved sleeve when the quick-release device is released, the connecting post having a free end with two opposite sides each having an L-shaped linkage mounted thereon, and two auxiliary wheels each rotatably mounted on a free end of each of the linkages.

Further benefits and advantages of the present invention will become apparent after a careful reading of the detailed description with appropriate reference to the accompanying drawings.

DETAILED DESCRIPTION OF THE INVENTION

Figure 1:
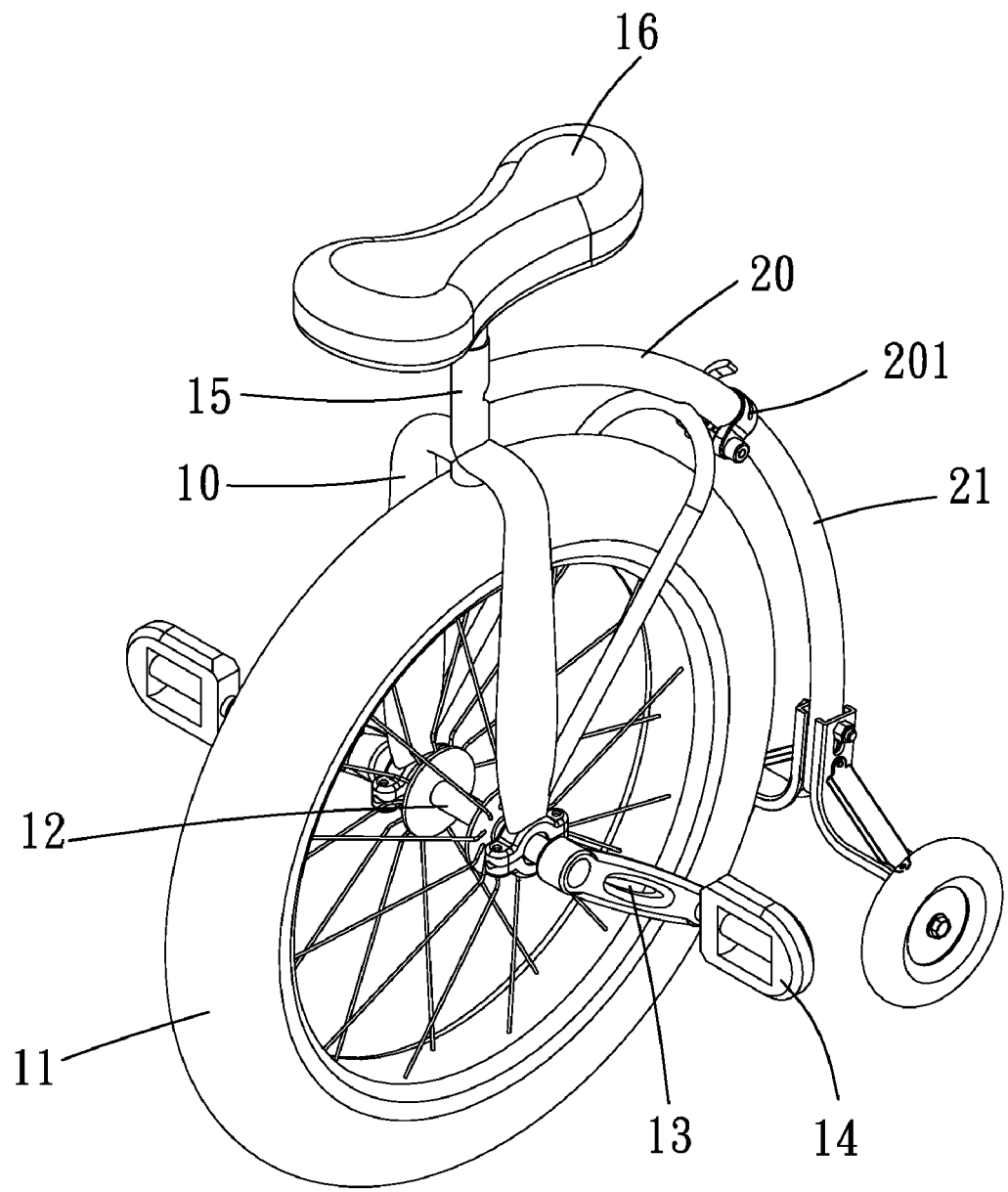
FIG. 1 is a perspective view of a unicycle with auxiliary wheels in accordance with the present invention.
Figure 2:
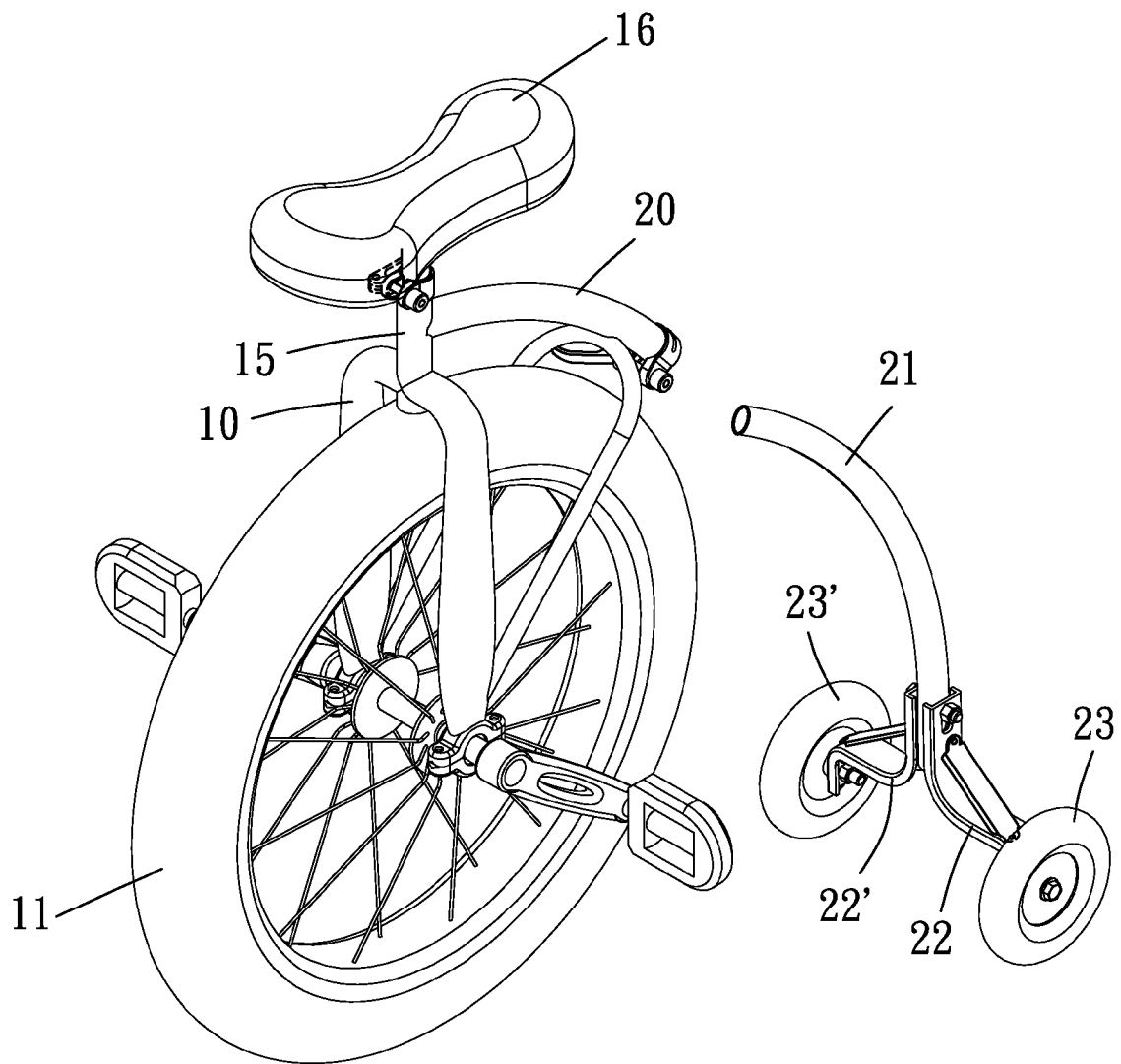
FIG. 2 is a partially exploded perspective view of the unicycle in FIG. 1.

Referring to the drawings and initially to FIGS. 1 and 2, a unicycle in accordance with the present invention comprises an n-shaped fork (10) with two lower open ends and an upper closed end. A wheel (11) is rotatably mounted between the open ends of the fork (10) via a drive axle (12) centrally extending through the wheel (11) and the open end of the fork (10). The drive axle (12) has two opposite ends each having a crank (13) mounted thereon. A pedal (14) is mounted to a free end of each of the two cranks (13) for user to step thereon and drive the wheel (11) via the drive axle (12). A seat post (15) is longitudinally and securely mounted to the close end of the fork (10) and a seat (16) is attached to a free end of the seat post (15) for user to sit thereon during riding the unicycle.

A curved sleeve (20) is connected to the seat post (15) from the rear of the unicycle. The curved sleeve (20) concentrically corresponds with the wheel (11). A quick-release device (201) is disposed to a free end of the curved sleeve (20). A connecting post (21) is partially received in the curved sleeve (20) and telescopic relative to the curved sleeve (20). The connecting post (21) is curved and concentrically corresponds with the wheel (11). As a result, the connecting post (21) can be freely moved relative to the curved sleeve (20) when the quick-release device (201) is released. The connecting post (21) has a free with to opposite sides each having an L-shaped linkage (22, 22') mounted thereon. An auxiliary wheel (23, 23') is rotatably mounted to a free end of each of the two linkages (22, 22').

Figure 3:
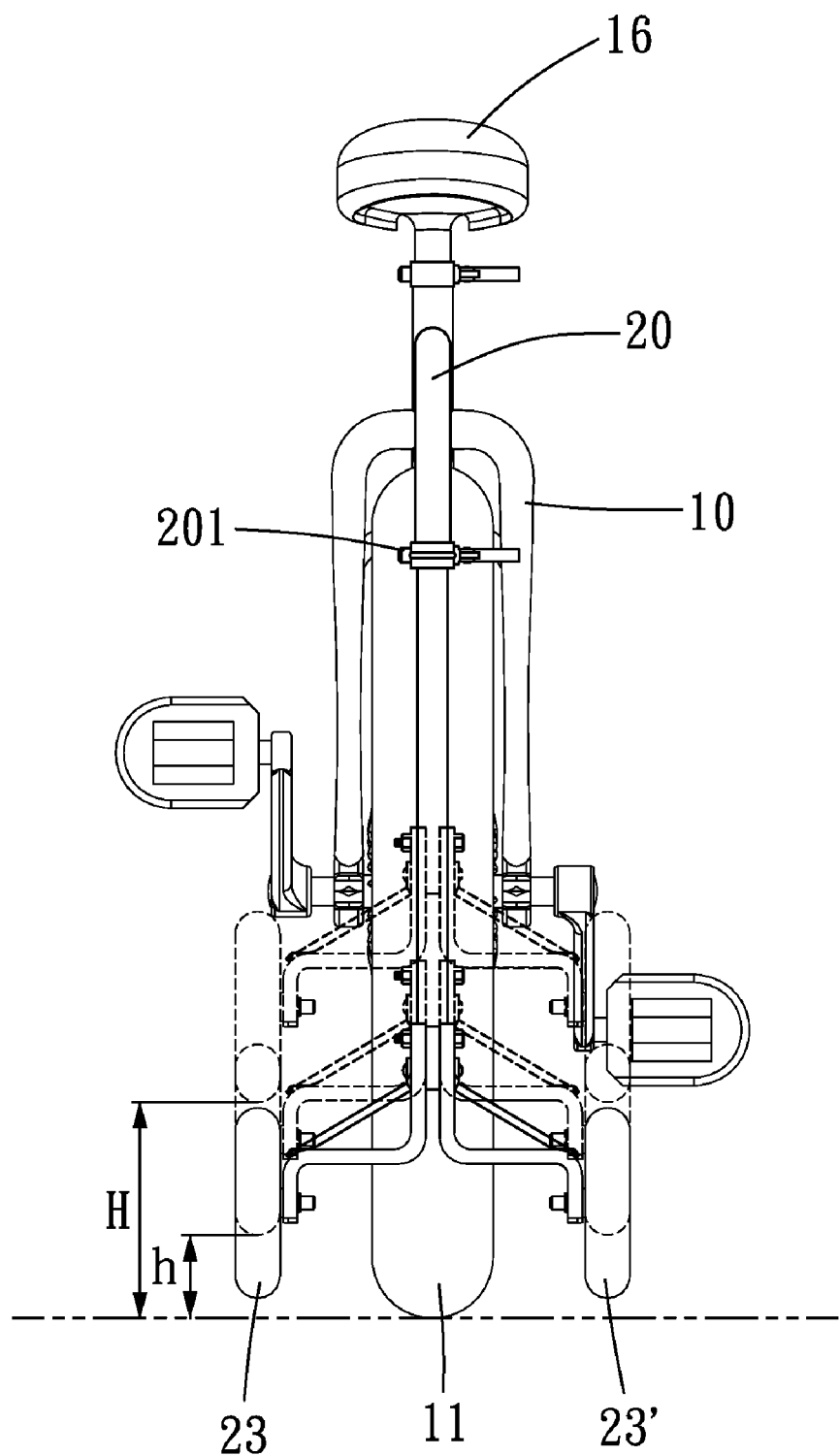
FIG. 3 is a rear plan view of the unicycle in FIG. 1 for showing the height of the auxiliary wheels being adjusted.
Figure 4:
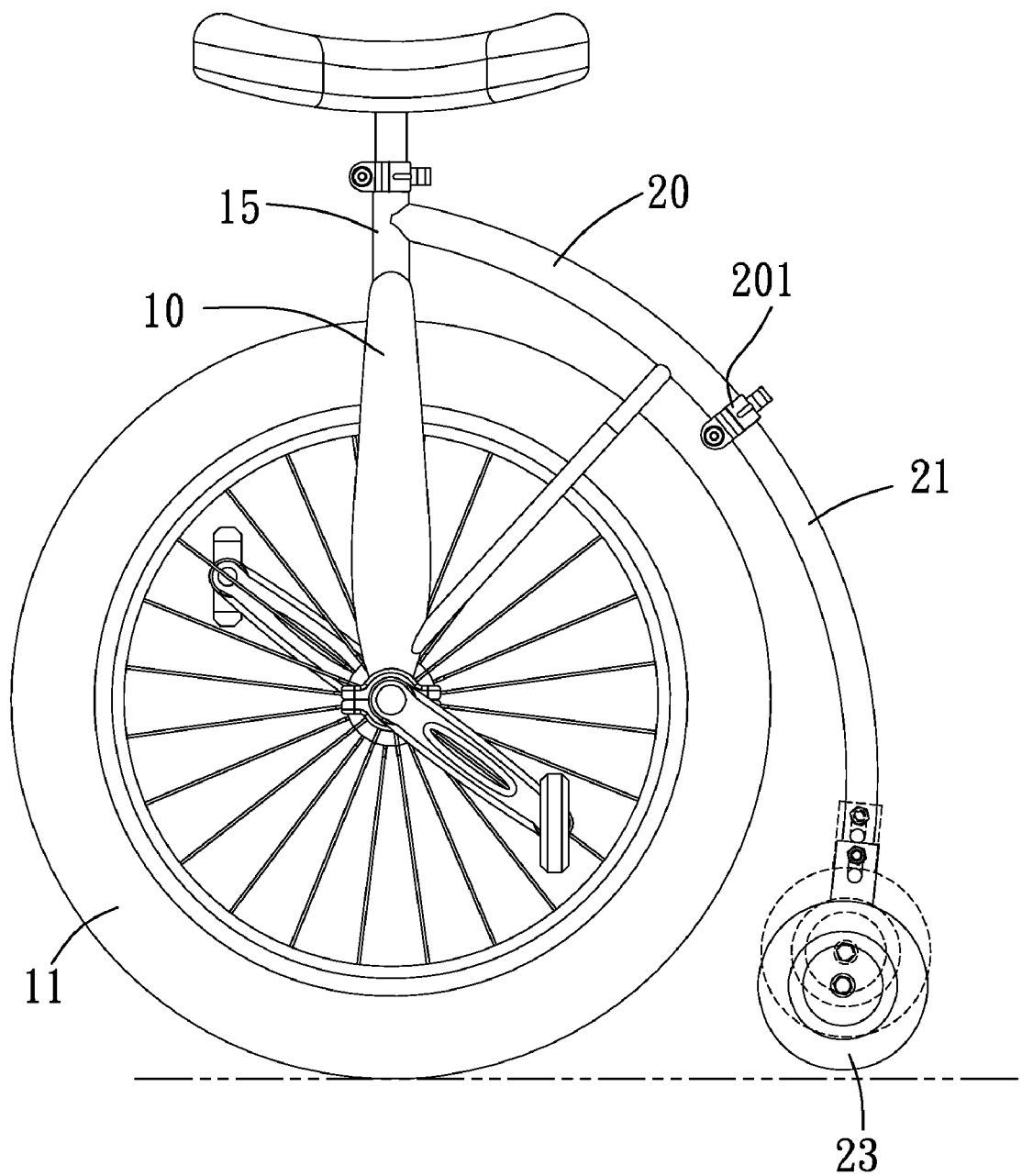
FIG. 4 is a side plan view of the unicycle in FIG. 1 for showing the height of the auxiliary wheels being adjusted.

With reference to FIGS. 3 and 4, the connecting post (12) fully extends to make the two auxiliary wheels (23, 23') contract with the supporting surface (ground) when the rider initially learns how to ride the unicycle. As a result, the wheel (11) and the two auxiliary wheel (23, 23') respectively abut against the ground to define a plane for supporting the unicycle and the rider to prevent the newcomer from falling from the unicycle. Now, the angle between the fork (10) and the ground is about 90 degrees. When the beginner's riding skill becomes better, the connecting post (21) is slightly inserted into the curved sleeve (20) to make the two auxiliary wheel (23, 23') separate from the ground and form a height (h). The two auxiliary wheels (23, 23') are separated from the ground when the unicycle is in a good riding condition. The two auxiliary wheels (23, 23') will contract with the ground when the rider loses his/her center of gravity to prevent the rider from falling from the unicycle. When the rider has a practiced skill for riding unicycle, the connecting post (21) is fully inserted into the curved sleeve (20) such that the height of the two auxiliary wheels (23, 23') is changed from (h) to (H). As a result, the two auxiliary wheels (23, 23') never abut against the ground during riding and the unicycle of the present invention is ridden as a conventional unicycle. In addition, the connecting post (21) with the two linkages (22, 22') and the two auxiliary wheels (23, 23') are disassembled from the curved sleeve (20) for the rider who has a practiced skill for riding unicycle.

Figure 5:
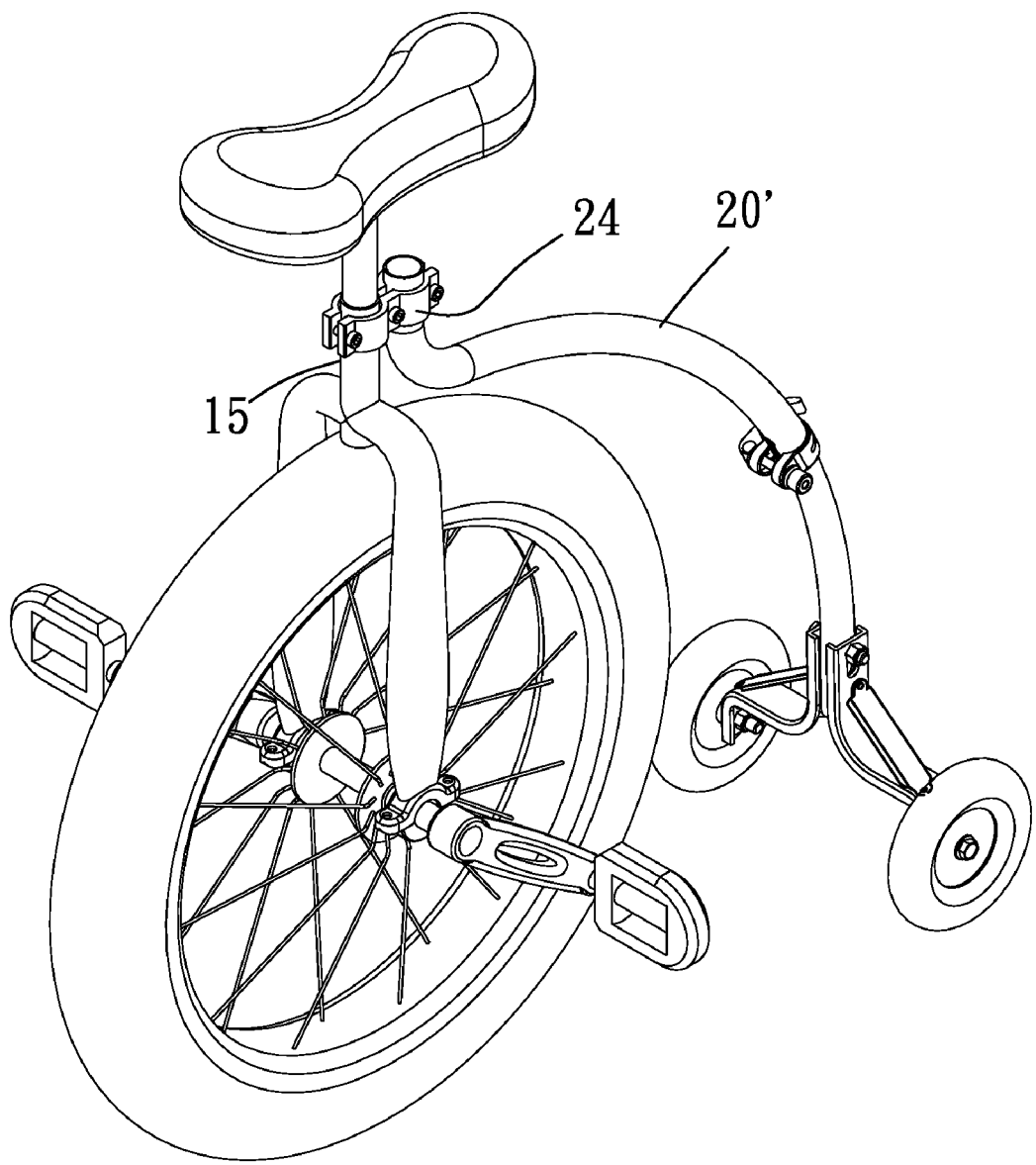
FIG. 5 is a perspective view of a second embodiment of the unicycle with auxiliary wheels in accordance with the present invention.

With reference to FIG. 5 that shows a second embodiment of the unicycle in accordance with the present invention, the curved sleeve (20') has one end opposite to the two auxiliary wheels (23, 23') having a clamp (24) mounted thereon for clamping the seat post (15) and the curved sleeve (20') at the same time to assemble the seat post (15) and the curved sleeve (20'). As a result, the curved sleeve (20'), the connecting post (21), the two linkages (22, 22') and the two auxiliary wheels (23, 23') can be used to a conventional unicycle to provide the advantages to the conventional unicycle.

Although the invention has been explained in relation to its preferred embodiment, it is to be understood that many other possible modifications and variations can be made without departing from the spirit and scope of the invention as hereinafter claimed.

What is claimed is:

1. A unicycle, comprising an n-shaped fork with two lower open ends and an upper closed end, a wheel rotatably mounted between the open ends of the fork via a drive axle centrally extending through the wheel and the open ends of the fork, the drive axle having two opposite ends each having a crank mounted thereon, a pedal mounted to a free end of each of the cranks for a user to step thereon and drive the wheel via the drive axle, a seat post longitudinally securely mounted on the closed end of the fork, a seat attached to a free end of the seat post for the user to sit thereon when riding the unicycle, a curved sleeve connected to the seat post from the rear of the unicycle, the curved sleeve being concentric relative to the wheel, a quick-release device disposed on a free end of the curved sleeve, a connecting post telescopically received in the curved sleeve, the connecting post being curved and concentrically corresponding to the wheel such that the connecting post is adapted to move relative to the curved sleeve when the quick-release device is released, the connecting post having a free end with two opposite sides each having an L-shaped linkage mounted thereon, and two auxiliary wheels each rotatably mounted on a free end of each of the linkages.

2. The unicycle as claimed in claim 1, wherein the curved sleeve has one end opposing the auxiliary wheels with a clamp mounted thereon for fastening the seat post and the curved sleeve together and connecting the curved sleeve to the seat post.

\* \* \* \* \*